United States Patent [19]

Schluckbier

[11] 4,333,421

[45] Jun. 8, 1982

[54] MILKING UNIT SUPPORT AND DETACHER MECHANISM

[75] Inventor: Gary W. Schluckbier, Madison, Wis.

[73] Assignee: DEC International, Inc., Madison, Wis.

[21] Appl. No.: 160,465

[22] Filed: Jun. 18, 1980

[51] Int. Cl.³ .............................. A01J 5/04; A01J 7/00
[52] U.S. Cl. ................................ 119/14.08; 119/14.1; 119/14.13
[58] Field of Search ................. 119/14.08, 14.1, 14.13, 119/14.11, 14.14, 14.45

[56] References Cited

U.S. PATENT DOCUMENTS

| | | | |
|---|---|---|---|
| 2,136,228 | 11/1938 | Babson et al. | 119/14.13 |
| 3,938,470 | 2/1976 | Pace | 119/14.08 X |
| 4,188,910 | 2/1980 | Hocker | 119/14.08 |
| 4,228,763 | 10/1980 | Heidecker et al. | 119/14.08 |

*Primary Examiner*—G. E. McNeill
*Assistant Examiner*—Robert P. Swiatek
*Attorney, Agent, or Firm*—Michael, Best & Friedrich

[57] ABSTRACT

A milking unit support and detacher mechanism is provided for supporting a milking unit when the milking unit is attached to a cow for milking. The detacher mechanism includes a support arm movable between a first position wherein the arm extends downwardly and a second position wherein the arm extends outwardly, and the arm has a free end engageable with the hose member for supporting the milking unit. The arm is supported by a first support bracket disposed for rotation about a horizontal axis and a second bracket supported by the first bracket and being pivotal about a vertical axis. The support structure also includes a friction disc for yieldably resisting pivotal movement of the arm about the vertical axis. The support structure also includes a spring having one end supported by one of the brackets and the other end supporting the support arm.

13 Claims, 3 Drawing Figures

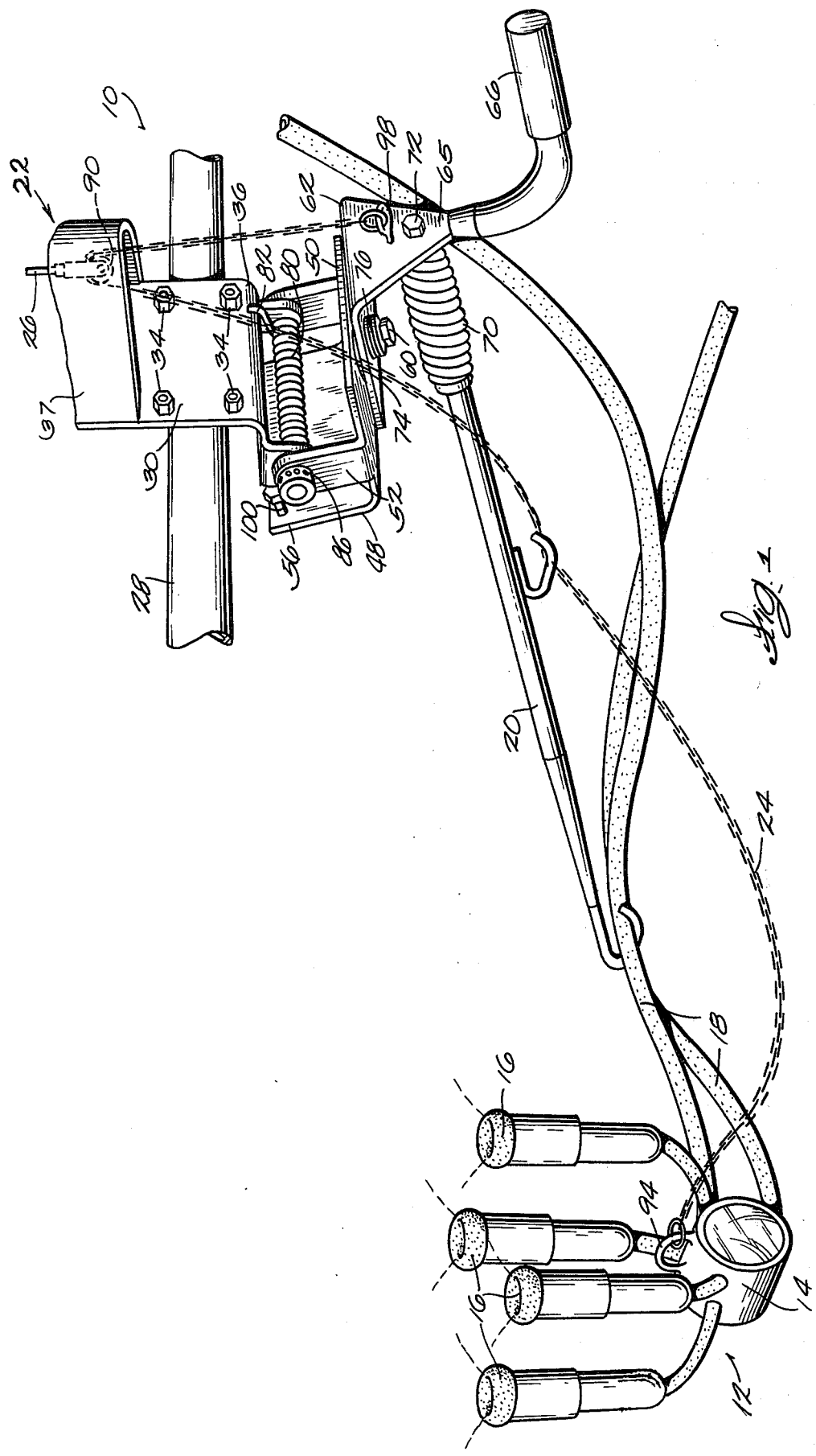

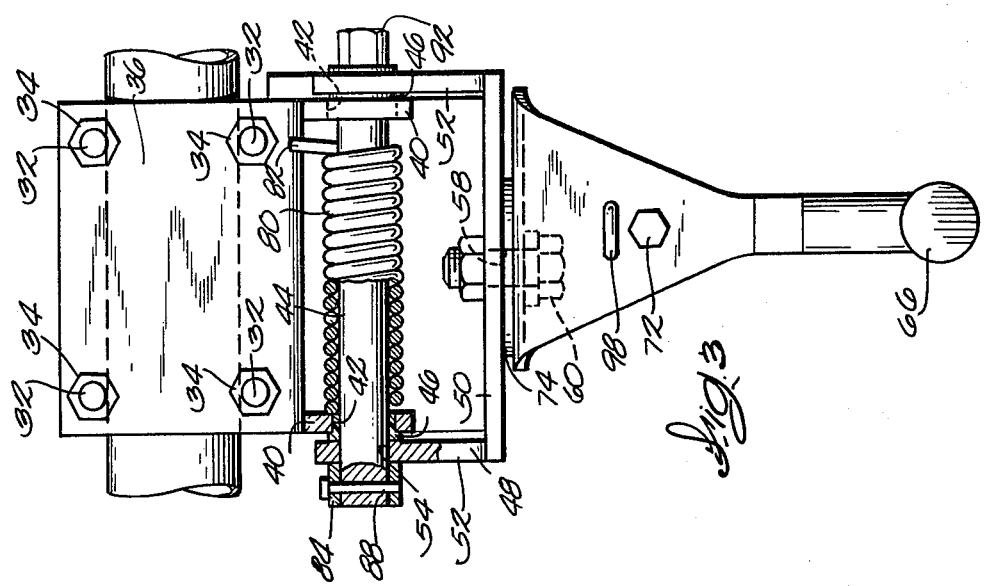
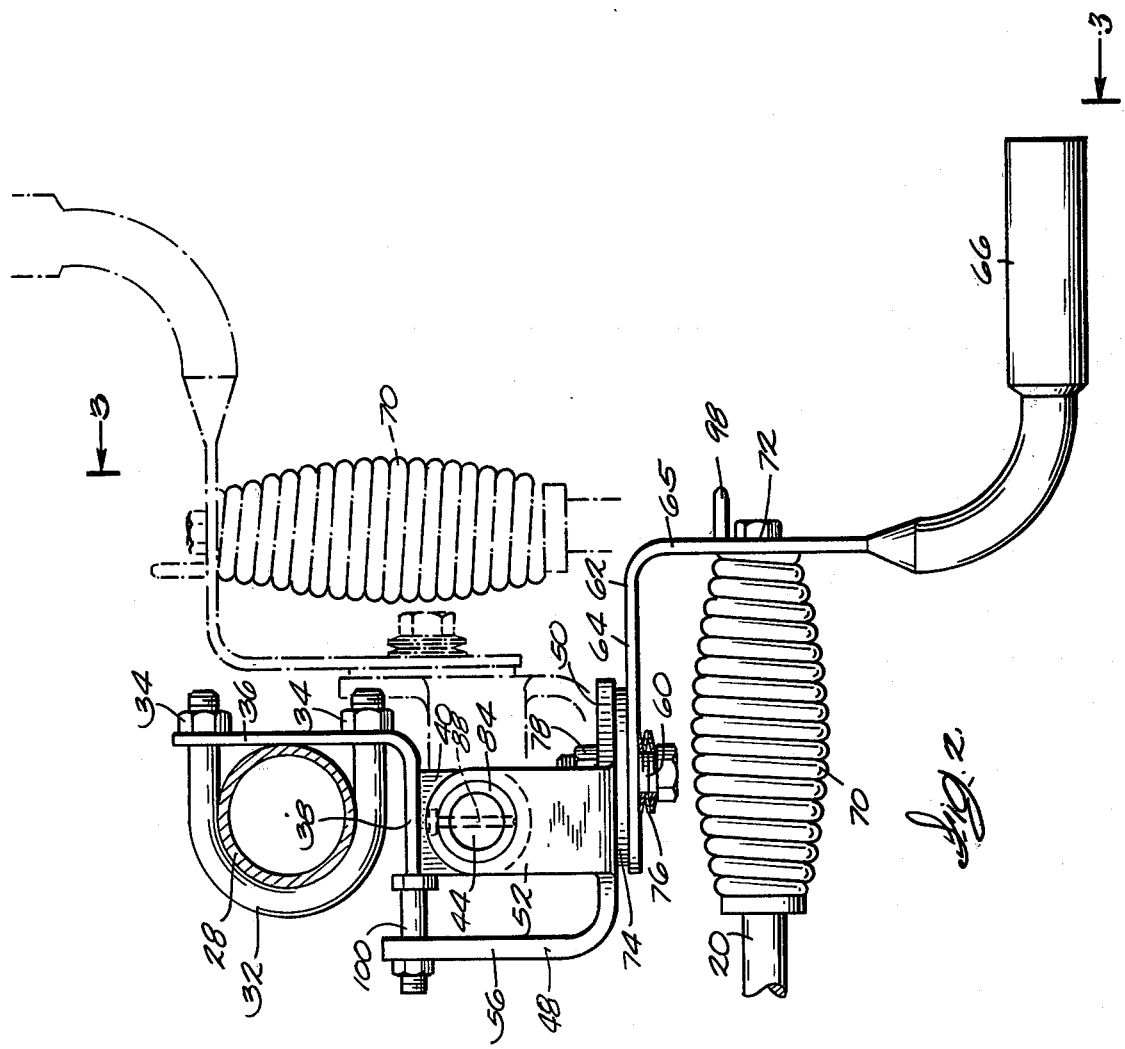

4,333,421

MILKING UNIT SUPPORT AND DETACHER MECHANISM

FIELD OF THE INVENTION

The invention relates to a milking unit support and detacher mechanism and more particularly to a mechanism for supporting a teat cup assembly beneath a cow during a milking cycle and for automatically detaching the milking unit from the cow upon completion of the milking cycle and for retracting the milking unit such that it is not allowed to fall to the ground.

BACKGROUND PRIOR ART

Examples of prior art milking unit support and detacher mechanism are shown in U.S. Pat. No. 4,228,763, issued Oct. 21, 1980, and U.S. Pat. No. 4,228,764, issued Oct. 21, 1980, and assigned to the assignees of the present invention.

Attention is also directed to U.S. Pat. Nos. 2,641,223; 2,775,224; 3,246,631; 3,556,053; 3,603,292; 3,690,300; 3,033,161; 3,789,798; 3,861,355; 3,938,470; 3,814,056; 3,893,422; and 3,929,103.

One of the principal goals in designing milking unit support and detacher mechanisms is a high reliability unit which is simple or at least uncomplicated in its construction and one which is relatively inexpensive to the dairy farmer. It is also desirable that the design reduce the manual labor or steps involved in the milking process to the greatest extent possible.

SUMMARY OF THE INVENTION

The present invention provides an improved milking unit support and detacher mechanism which is intended to achieve those goals and to overcome the deficiencies of prior art detacher mechanisms.

More particularly, the present invention includes a milking unit support and detacher mechanism for supporting a milking unit when the milking unit is attached to a cow for milking, the milking unit having a teat cup assembly and at least one hose member extending from the assembly. The milking unit support and detacher mechanism comprises a milking unit support arm movable between a first position wherein the arm extends downwardly and a second position wherein the arm extends outwardly. The milking unit support arm has a free end engageable with the hose member in spaced relation to the teat cup assembly for supporting the milking unit when the milking unit is attached to a cow for milking and when the arm is in the second position. The support and detacher mechanism also includes support means for the milking unit support arm and including first means disposed for rotation about a vertical axis and second means disposed for pivotal movement about a generally horizontal axis. The milking unit support arm is attached to one of the first and second means for pivotal movement about the vertical axis and the horizontal axis.

One of the principal features of the invention is that the support means includes friction means for yieldably resisting pivotal movement of the arm about the vertical axis. In one embodiment of the invention the support means includes a plate member, the second means includes a second plate member and the friction means includes a friction disc sandwiched between the plate members. Means are also provided for biasing one of the plate members toward the other of the plate members.

Another of the principal features of the invention is that the support means includes a spring having opposite ends, one of the ends of the spring being supported by one of the first and second means, and the other of the ends of the spring supporting the milking unit support arm.

Another of the principal features of the invention is the provision of a means for moving the support arm from the outwardly extending position to the downwardly extending position. The moving means includes a flexible member having opposite ends, one of the ends being connected to the teat cup assembly and the other of the ends being connected to the milking unit support arm. A fluid motor including a reciprocable member is also provided and a portion of the flexible member intermediate its opposite ends is connected to the reciprocable member.

Various other features of the invention will be apparent from the following description, from the claims and from the drawings.

BRIEF DESCRIPTION OF THE DRAWINGS

FIG. 1 is a perspective view of a milking unit and a milking unit support and detacher mechanism embodying the invention.

FIG. 2 is an enlarged partial elevation view of the milking unit support and detacher mechanism shown in FIG. 1 and with a portion thereof shown in a retracted position in phantom.

FIG. 3 is a cross section view taken generally along line 3—3 in FIG. 2.

Before describing at least one embodiment of the invention in detail, it is to be understood that the invention is not limited in its application to the details of construction or the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Referring to FIG. 1, the milking unit support and detacher mechanism which is indicated generally by reference numeral 10 is adapted to be used with a milking unit apparatus 12 of any suitable design. The milking unit apparatus 12 shown in FIG. 1 is comprised of a claw unit 14, a plurality of teat cups 16 and milk and vacuum lines 18.

The milking unit support and detacher mechanism 10 generally comprises a retractable milker unit support arm 20 and a retracting assembly 22 which includes a flexible retracting member 24, shown in FIGS. 1-3 as a chain, and having one end attached to the claw 14 of the milking unit 12. The flexible retracting member is also connected to the lower end of a downwardly extending piston 26 of a fluid motor (not shown) such as a pneumatic cylinder supported by the rump rail 28.

The milking unit support arm 20 is intended to support the weight of the milk lines or hoses 18 and to position the milk lines beneath the center of the cow such that milk lines 18 do not tend to pull the claw 14 to the side of the cow or in any direction which may retard the milking process. The retracting assembly 22, including the flexible retracting member 24 is intended to pull the milking unit 12 away from the cow at the completion of the milking cycle. One of the required features of the retracting assembly 22 is that it pulls the milking unit 12 upwardly as it pulls it away from the cow and such that the milking unit is not contaminated by contact with the ground.

Referring to the milking unit support arm 20, means are provided for supporting the support arm from the rump rail 28 and for permitting pivotal movement of the support arm 20 about both a horizontal pivot axis and a vertical pivot axis. The support means includes a support bracket 30 secured to the rump rail 28 by a pair of U-bolts 32 and nuts 34. The support bracket 30 includes a vertical portion 36 rigidly attached to the rump rail 28. A vertical housing 37 is supported by the vertical portion 36 and is adapted to support the fluid motor therein in vertical orientation and with the piston 26 extending vertically downwardly. The support bracket 30 also includes a generally horizontal bracket portion 38 (FIG. 2) extending from the lower edge of the vertical bracket portion 36 and beneath the rump rail 28. The bracket 30 also includes a pair of arms 40 extending downwardly from opposite sides of the horizontal bracket portion 38 and including aligned bores 42 for housing a generally horizontal pivot shaft 44. The aligned bores 42 each house a teflon/fiberglass bearing 46 to permit relatively free rotation of the pivot shaft 44 in the aligned bores 42.

The pivot shaft 44 functions to support a bracket member 48 for pivotal movement about the axis of the pivot shaft 44. The bracket member 48 includes a planar portion 50 supporting two upwardly extending legs 52, the legs 52 including aligned bores 54 receiving the pivot shaft 44. The bracket 48 also includes a generally upwardly extending planar transverse portion 56 (FIG. 2). The planar portion 50 of the bracket 48 includes a central bore 58 housing a second or generally vertical pivot member 60 which in turn supports a lower bracket member 62. The lower bracket member 62 includes a planar portion 64 adapted to be positioned adjacent and below the planar portion 50 of the bracket member 48 and to be generally parallel thereto. The bracket 62 also includes a transverse portion 65 adapted to support a handle 66 and the support arm 20.

The support means further includes a spring 70 having one end supporting the support arm 20 and an opposite end fixed to the downwardly extending portion 65 of the lower bracket member 62. In the illustrated construction, the spring 70 comprises a coil spring having one end including a threaded nut integrally attached thereto and whereby that end can be secured to the downwardly extending portion of the lower bracket member by a bolt 72. In the illustrated construction the opposite end of the coil spring also includes a threaded nut integrally attached thereto, and the support arm 20 includes a threaded end threadably engaging the nut.

The coil spring 70 joining the support arm to the bracket 62 permits limited flexibility of the support arm 20 with respect to the support assembly. It is not uncommon that a cow might kick the support arm 20 during the milking operation. The coil spring 70 permits movement of the support arm and prevents damage to either the support arm or the support assembly in such instances. It is also desirable in some instances that the support arm 20 apply a forward tension on the milking lines 18 such that they will tend to tilt the claw 14 forwardly. The coil spring 70 permits the position of the lower bracket 62 to be manually positioned by means of the handle 66 such that the coil spring 70 will apply a forward force on the support arm 20.

Means are also provided to create a predetermined frictional resistance to pivotal movement of the lower bracket member 62 about the axis of the pivot member 60 and with respect to the bracket member 48 such that when the lower bracket member 62 is pivoted to thereby vary the relative fore and aft position of the free end of the supporting arm 20, that position will be maintained. Such frictional resistance means comprises a friction plate or disc 74 formed from a circular disc, preferably formed from conventional clutch disc material, the circular disc having a central bore receiving the pivot member 60 therethrough, and being sandwiched between the planar portion 50 of the bracket 48 and the planar portion 64 of the lower bracket member 62. In the illustrated construction, the pivot member 60 comprises a bolt and a plurality of spring washers 76 are maintained in compressed relation between the head of the bolt and the lower surface of the planar portion 64 of the lower bracket member 62 whereby the planar portions 50 and 64 are forced together by the compressive force of the spring washers 76. This force can be adjusted by tightening the bolt 60 which is threaded through plate 50 and locking nut 78.

Means are also provided for spring biasing the support arm 20 from a generally vertically downward position or retracted position, as shown in phantom in FIG. 2, to an outwardly extending position as shown in FIGS. 1 and 2 and wherein the end of the support arm 20 can extend beneath the cow so as to support the milk lines 18 of the milking unit. In the illustrated construction, such means comprise a coil or torsion spring 80 surrounding the pivot shaft 44. One end 82 of the torsion spring extends upwardly and engages the vertical portion 36 of the bracket 30 and an opposite end of the torsion spring 80 is housed in a slot in the pivot shaft 44. As also shown in FIG. 3, the upwardly extending arm 52 of the bracket 48 includes a collar 84 fixed thereto and surrounding one end of the pivot shaft 44. The collar 84 includes a plurality of circumferentially spaced bores 86 (FIG. 1) which can be selectively aligned with bore extending through the pivot shaft. A pin 88 extends through selected aligned bores 86 in the collar 84 and through the bore in the pivot shaft 44 so as to cause rotation of the bracket 48 with the pivot shaft 44. By removing the pin 88 and rotating the pivot shaft 44 with respect to the bracket 48 and with respect to the bracket member 30, the force of the torsion spring 80 can be increased. One end of the pivot shaft 44 is provided with a hexagonal head 92 to facilitate rotation of the pivot shaft 44 and adjustment of the force of the torsion spring 80.

Referring now to the retraction mechanism, the flexible member or chain 24 is connected at one end to a ring 94 on the claw 14 of the milking unit 12. An opposite end of the chain 24 extends over a pulley 90 supported by the lower end of the piston 26 and is fixedly connected to the downwardly extending portion 65 of the bracket 62 by means of a connecting ring 98.

Means are also provided for preventing the support arm 20 from hitting the cow as it moves from its downward retracted position to a position beneath the cow. In the illustrated arrangement such means comprises a stop member for limiting the relative pivotal movement of the bracket member with respect to the bracket 30. The upwardly extending planar portion 56 of the bracket 48 includes a threaded bore adjacent its upper end. The threaded bore houses a bolt 100 adapted to engage the bracket 30 when the support arm is in its outwardly extended position. The bolt 100 can be threadably adjusted to vary the position of the support arm 20 when it is in its extended position.

In operation of the milking unit detacher mechanism 10 of the invention, the milking unit apparatus 12 and the fluid motor 26 are intended to be controlled by a four-way solenoid operated valve and a milk flow control valve (not shown) of the type specifically described in the Schluckbier U.S. Pat. No. 3,929,103, issued Dec. 30, 1975. To initiate the milking cycle, the operator grasps the claw 14 of the milking apparatus and actuates the fluid motor control means to cause downward movement of the piston 26 thereby permitting extension of the chain 24. The torsion spring 80 causes the support arm 20 to swing outwardly to a position shown in FIG. 1 and underneath the cow such that the milk lines 18 are positioned under the center of the cow. The operator supports the claw 14 until the milking unit 12 is attached to the cow.

If the operator desires to have the milk lines 18 apply a forward tension on the claw 14, using the handle 66, the lower bracket member 62 is pivoted about the axis of the pivot member 60 such that the free end of the support arm 20 tends to pull the milk lines forwardly with respect to the cow. The milk lines 18 are formed of a rubber like material and due to their frictional characteristics will not easily slip through the hook in the free end of the support arm 20. The effect of the friction disc 74 is to tend to prevent subsequent pivotal movement of the lower bracket member 62 about the axis of the bolt 60 once the support arm 20 has been positioned. The coil spring 70 will also function to cause the end of the support arm 20 to maintain a forward tension on the milk lines 18.

At the completion of the milking cycle, the milk flow control mechanism described above senses a reduction in milk flow and terminates the milking cycle. Simultaneously, the fluid motor is actuated by the milk flow control mechanism to cause upward movement of the piston 26. Such upward movement of the piston 26 first removes the slack from the chain 24 and then applies an upward force on the lower bracket member 62 and at the same time causes the milking unit to be pulled away from the cow and upwardly. In practice, a force is required to cause initial retraction of the milking unit. Accordingly, after the slack has been taken out of the chain 24, the free end of the support arm 20 will begin to move downwardly toward its retracted position, and then the milking unit 12 will be pulled away from the cow and upwardly toward its retracted position.

Various features of the invention are set forth in the following claims.

I claim:

1. A milking unit support and detacher mechanism for supporting a milking unit when the milking unit is attached to a cow for milking, said milking unit having a teat cup assembly and at least one hose member extending from said assembly, the milking unit support and detacher mechanism comprising:

a milking unit support arm movable between a first position wherein said arm extends downwardly and a second position wherein said arm extends outwardly, said milking unit support arm having a free end engageable with said hose member in spaced relation to said teat cup assembly for supporting said milking unit when the milking unit is attached to a cow for milking and when said arm is in said second position; and support means for said milking unit support arm and including a first support member, means for supporting the first support member for rotation about a generally horizontal axis, a second support member, and means connected to said first support member and supporting said second support member for pivotal movement about an axis transverse to said generally horizontal axis, and said milking unit support arm being attached to said second support member for movement about said transverse axis and said horizontal axis, and said support means including friction means for yieldably resisting pivotal movement of said arm about said transverse axis.

2. A milking unit support arm as set forth in claim 1 wherein said first support member includes a plate member, wherein said second support member includes a second plate member, and wherein said friction means includes a friction disc sandwiched between said plate members and means for forcing one of said plate members toward the other of said plate members.

3. A milking unit support and detacher mechanism as set forth in claim 2 wherein said support means includes a spring having opposite ends, one of said ends being supported by said second support member, and the other of said ends supporting said milking unit support arm.

4. A milking unit support and detacher mechanism for supporting a milking unit when the milking unit is attached to a cow for milking, said milking unit having a teat cup assembly and at least one hose member extending from said assembly, the milking unit support and detacher mechanism comprising:

a milking unit support arm movable between a first position wherein said arm extends downwardly and a second position wherein said arm extends outwardly, said milking unit support arm having a free end engageable with said hose member in spaced relation to said teat cup assembly for supporting said milking unit when the milking unit is attached to a cow for milking and when said arm is in second position; and support means for said milking unit support arm and including first means disposed for rotation about a generally horizontal axis and second means disposed for pivotal movement about an axis transverse to said generally horizontal axis, and said milking unit support arm being attached to one of said first and second means for movement about said transverse axis and said horizontal axis, and said support means including friction means for yieldably resisting pivotal movement of said arm about said transverse axis, and said support means including a spring having opposite ends, one of said ends being supported by said one of said first and second means, and the other of said ends supporting said milking unit support arm.

5. A milking unit support and detacher mechanism as set forth in claim 4 and further including means for moving said support arm from said outwardly extending position to said downwardly extending position, said moving means including a flexible member having opposite ends, one of said ends being connected to said teat cup assembly, the other of said ends being connected to said milking unit support arm, and fluid motor means including a reciprocable member, a portion of said flexible member intermediate its opposite ends being connected to said reciprocable member.

6. A milking unit support and detacher mechanism as set forth in claim 5 wherein said reciprocable member is movable vertically from a downward position to an upward retracted position.

7. A milking unit support and detacher mechanism as set forth in claim 5 and further including a lever arm fixedly connected to said milking unit support arm and supported for pivotal movement with said support arm, and wherein said other of said ends of said flexible member is connected to said lever arm.

8. A milking unit support and detacher mechanism for supporting a milking unit when the milking unit is attached to a cow for milking, said milking unit having a teat cup assembly and at least one hose member extending from said assembly, the milking unit support and detacher mechanism comprising:
- a milking unit support arm movable between a first position wherein said arm extends downwardly and a second position wherein said arm extends outwardly, said milking unit support arm having a free end engageable with said hose member in spaced relation to said teat cup assembly for supporting said milking unit when the milking unit is attached to a cow for milking and when said arm is in said second position; and
- support means for said milking unit support arm including first means disposed for rotation about a horizontal axis and second means disposed for pivotal movement about an axis transverse to said horizontal axis, and said milking unit support arm being attached to one of said first and second means for movement about said transverse axis and said horizontal axis, and said support means including a spring having opposite ends, one of said ends being supported by said one of said first and second means and the other of said ends supporting said milking unit support arm.

9. A milking unit support and detacher mechanism as set forth in claim 8 and further including means for moving said support arm from said outwardly extending position to said downwardly extending position, said moving means including a flexible member having opposite ends, one of said ends being connected to said teat cup assembly, the other of said ends being connected to said milking unit support arm, and fluid motor means including a reciprocable member, a portion of said flexible member intermediate its opposite ends being connected to said reciprocable member.

10. A milking unit support and detacher mechanism as set forth in claim 9 and further including a lever arm fixedly connected to said milking unit support arm and supported for pivotal movement with said support arm, and wherein said other of said ends of said flexible member is connected to said lever arm.

11. A milking unit support and detacher mechanism for supporting a milking unit when the milking unit is attached to a cow for milking, said milking unit having a teat cup assembly and at least one hose member extending from said assembly, the milking unit support and detacher mechanism comprising:
- a milking unit support arm movable between a first position wherein said arm extends downwardly and a second position wherein said arm extends outwardly, said milking unit support arm having a free end engageable with said hose member in spaced relation to said teat cup assembly for supporting said milking unit when the milking unit is attached to a cow for milking and when said arm is in said second position; and
- support means for said milking unit support arm including a first bracket, means for supporting said first bracket for rotation about a horizontal axis, a second bracket, means supported by said first bracket and supporting said second bracket for pivotal movement about an axis transverse to said horizontal axis, and said milking unit support arm being attached to said second bracket for movement about said transverse axis and said horizontal axis, and
- means for moving said support arm from said outwardly extending position to said downwardly extending position, said moving means including a flexible member having opposite ends, one of said ends being connected to said teat cup assembly, the other of said ends being connected to said milking unit support arm, and fluid motor means including a reciprocable member, a portion of said flexible member intermediate its opposite ends being connected to said reciprocable member.

12. A milking unit support and detacher mechanism as set forth in claim 11 and wherein said reciprocable member is movable vertically from a downward position to an upward retracted position.

13. A milking unit support and detacher mechanism as set forth in claim 11 and further including a lever arm fixedly connected to said milking unit support arm and supported for pivotal movement with said support arm, and wherein said other of said ends of said flexible member is connected to said lever arm.

* * * * *

UNITED STATES PATENT AND TRADEMARK OFFICE
CERTIFICATE OF CORRECTION

PATENT NO. : 4,333,421

DATED : June 8, 1982

INVENTOR(S) : Gary W. Schluckbier

It is certified that error appears in the above-identified patent and that said Letters Patent is hereby corrected as shown below:

Column 4, line 43, after "with" insert -- a --

Column 6, line 44, after "in" insert -- said --.

Signed and Sealed this

Twenty-first Day of December 1982

[SEAL]

Attest:

Attesting Officer

GERALD J. MOSSINGHOFF

Commissioner of Patents and Trademarks